US008360532B2

(12) United States Patent
Nishino et al.

(10) Patent No.: US 8,360,532 B2
(45) Date of Patent: Jan. 29, 2013

(54) BRAKE CONTROL SYSTEM

(75) Inventors: Kimio Nishino, Hitachinaka (JP); Toshiyuki Innami, Mito (JP); Yuzo Kadomukai, Ishioka (JP); Shingo Nasu, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 312 days.

(21) Appl. No.: 12/388,978

(22) Filed: Feb. 19, 2009

(65) Prior Publication Data

US 2009/0236903 A1 Sep. 24, 2009

(30) Foreign Application Priority Data

Mar. 24, 2008 (JP) ................................ 2008-074837

(51) Int. Cl.
 *B60T 8/88* (2006.01)
(52) U.S. Cl. ............................... 303/122.03; 303/DIG. 9
(58) Field of Classification Search . 303/3, 122–122.15, 303/155, DIG. 9, 115.2
See application file for complete search history.

(56) References Cited

U.S. PATENT DOCUMENTS

| 6,157,887 A * | 12/2000 | Zittlau ............................ 701/70 |
| 2001/0035679 A1 | 11/2001 | Riddiford et al. |
| 2002/0043875 A1* | 4/2002 | Braun ........................... 303/166 |
| 2003/0234574 A1* | 12/2003 | Reuter et al. ................. 303/116.2 |
| 2006/0232128 A1 | 10/2006 | Weiberle et al. |
| 2007/0090690 A1* | 4/2007 | Ohkubo ......................... 303/122 |
| 2007/0170774 A1* | 7/2007 | Gerum et al. ................... 303/20 |
| 2008/0001475 A1* | 1/2008 | Kito et al. ..................... 303/155 |
| 2009/0127929 A1* | 5/2009 | Sawada et al. ........... 303/122.09 |

FOREIGN PATENT DOCUMENTS

| DE | 197 22 532 A1 | 12/1998 |
| DE | 197 42 988 C1 | 1/1999 |
| DE | 103 16 452 A1 | 10/2004 |
| FR | 2 877 302 A1 | 5/2006 |
| JP | 2001-513041 A | 8/2001 |
| JP | 2008-55992 A | 3/2008 |
| WO | WO 98/35867 A1 | 8/1998 |
| WO | WO 2006/048571 A1 | 5/2006 |

OTHER PUBLICATIONS

European Search Report dated Jul. 7, 2009 (three (3) pages).

* cited by examiner

*Primary Examiner* — Bradley King
*Assistant Examiner* — Vishal Sahni
(74) *Attorney, Agent, or Firm* — Crowell & Moring LLP

(57) ABSTRACT

A brake control system for a vehicle includes a first controller having a first brake operation quantity sensor and a second controller executing a different control from that of the first controller and having a second operation quantity sensor. The second controller may include a master pressure acquisition unit for acquiring a master pressure and a failure detection unit for detecting a failure of the first controller on the basis of the brake operation quantity detected by the second brake operation quantity sensor and the master pressure acquired by the master pressure acquisition unit.

6 Claims, 5 Drawing Sheets

BRAKE CONTROL SYSTEM

BACKGROUND OF THE INVENTION

This invention relates to a brake control system of vehicles.

A vacuum booster has been used ordinarily as a brake booster. The vacuum booster uses an intake negative pressure of an internal combustion engine. A vacuum pump may be used in place of the intake negative pressure of the internal combustion engine. In the latter case, however, the likelihood of a failure of the brake booster is greater than for a conventional system. Accordingly, it is known to suppress any drop of braking force by using a pump of an anti-lock control system when the brake booster is out of order(refer to JP-A-2001-513041 corresponding to International Publication No. WO98/35867).

According to this patent document, however, the method of suppressing the drop of the braking force by the anti-lock control system at the time of the trouble of the brake booster is not clear and concrete. When the drop of the braking force is suppressed by using the pump of the anti-lock control system, for example, the drop of the braking force cannot be suppressed so readily by sensing the brake operating condition through a master pressure sensor of the system and controlling the master pressure to a target value, because the depressing force and the stroke for generating the master pressure via the brake pedal operation are great. Therefore, the brake becomes inoperable until the master pressure recovers, and a driver may feel loosing of braking force.

SUMMARY OF THE INVENTION

It is therefore an object of the invention to provide a brake control system that can generate braking force as required by a driver in the same way as in the case of a normal operation even when a brake booster is out of order.

A preferred form of the invention for accomplishing the object is as follows.

A brake control system includes a first controller having a first brake operation quantity sensor and a second controller having a second brake operation quantity sensor, for executing a type of control that differs from that of the first controller.

The invention can provide a brake control system that can generate braking force as required by a driver even when a brake booster is out of order.

Other objects, features and advantages of the invention will become apparent from the following description of the embodiments of the invention taken in conjunction with the accompanying drawings.

DESCRIPTION OF THE EMBODIMENTS

Preferred embodiments of the invention will be hereinafter explained with reference to the accompanying drawings.

Figure 1:
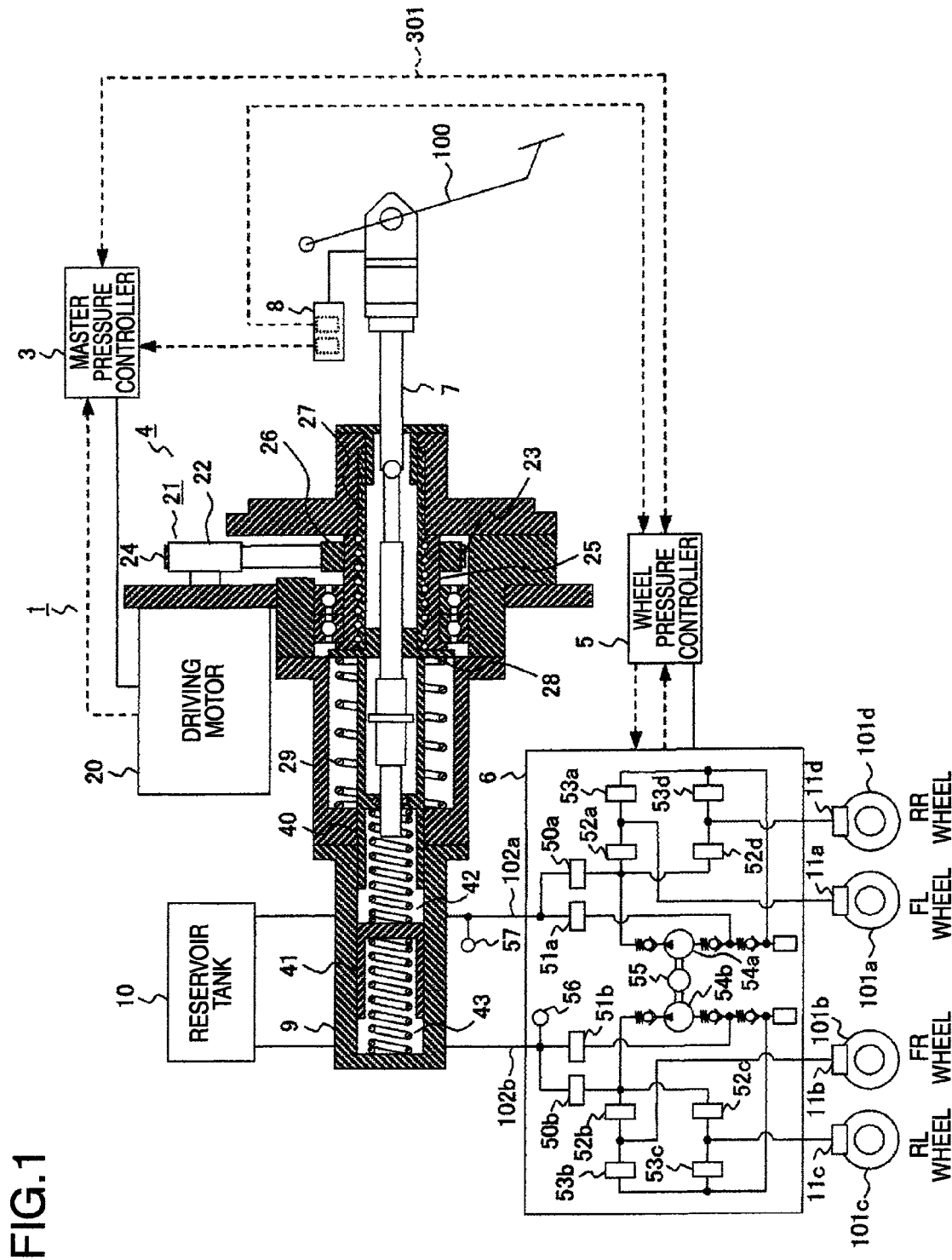
FIG. 1 is a structural view showing an overall construction of a brake controller. Broken lines with an arrow represent signal lines and the direction of the arrow represents the flow of the signals.

FIG. 1 is a structural view showing an overall construction of a brake controller. Broken lines with arrow represent signal lines and the direction of the arrow represents the flow of the signals.

The brake control system 1 includes a master pressure controller 3, a master pressure control mechanism 4, a wheel pressure controller 5, a wheel pressure control mechanism 6, an input rod 7, a brake operation quantity sensor 8, a master cylinder 9, a reservoir tank 10 and wheel cylinders 11a to 11d.

Incidentally, a first boosting unit includes the brake pedal 100 and the input rod 7 and a second boosting unit includes the master pressure controller 3, the master pressure control mechanism 4 and a primary piston 40.

The master pressure controller 3 and the wheel pressure controller 5 execute bidirectional communication and share control instructions and car condition quantities (yaw rate, longitudinal acceleration, lateral acceleration, steering angle, wheel speed, vehicle speed, failure information, operating condition, etc).

The master pressure controller 3 (corresponding to the brake booster) controls a driving motor 20 on the basis of the signals of the brake operation quantity sensor 8 and control instructions from the wheel pressure controller 5.

The master pressure control mechanism 4 pushes the primary piston 40 in accordance with the control instruction of the master pressure controller 3 and includes the driving motor 20 that generates rotational torque, a speed reduction unit 21 that amplifies the rotational torque of the driving motor 20 and a rotation-translation motion converter 25 that converts the rotational force to the translational force.

The wheel pressure controller 5 (corresponding to the anti-lock control system) calculates target braking force to be generated in each wheel on the basis of the distance from a preceding car, road information and the car condition quantities and controls the wheel pressure control mechanism 6 on the basis of the calculation result.

The wheel pressure control mechanism 6 controls the supply of a working liquid pressurized by the master cylinder 9 to each wheel cylinder 11a to 11d in accordance with the control instruction of the wheel pressure controller 5.

The input rod 7 is interconnected to the brake pedal 100 and one of its ends is inserted into a primary liquid chamber 42. When such a construction is employed, the master pressure can be increased by the brake operation of the driver, too. In consequence, a predetermined braking force can be secured even when the driving motor 20 accidentally stops its revolution. Force corresponding to the master pressure is applied on the brake pedal 100 through the input rod 7 and is transmitted as a brake pedal reaction force to the driver. Therefore, the construction eliminates the necessity of a device for generating brake pedal reaction force such as a spring that will be necessary when the construction is not employed. It becomes eventually possible to reduce the size and weight of the brake control system 1 and to realize easier installing of the system in the car.

The brake operation quantity sensor 8 is a kind of the sensor that detects required braking force of the driver and includes the combination of a plurality of displacement sensors for detecting the displacement quantity of the input rod 7. As the physical quantities to be detected by the displacement sensors, it is possible to detect the displacement quantity of the input rod 7, the stroke quantity of the brake pedal 100, the moving angle of the brake pedal, the depressing force of the brake pedal 100 or a plurality of kinds of sensor information in combination.

The brake operation quantity sensor 8 may also be composed of a combination of a plurality of depressing force sensors for detecting the depressing force of the brake pedal 100 or a combination of the displacement sensor and the depressing force sensor. Consequently, when the signals from one sensor are cut off, the remaining sensors can detect and recognize the brake request of the driver and can secure fail-safe.

The power source supply and signal input processing are executed by the wheel pressure controller 5 for at least one sensor inside the brake operation quantity sensor 8 and by the master pressure controller 3 for the rest of the sensors. Therefore, when CPU failure or power source failure occurs in either of the master pressure controller 3 and the wheel pressure controller 5, the remaining sensors and controllers detect and recognize the brake request of the driver to secure fail-safe.

Turning back to FIG. 1, the brake operation quantity sensor 8 is illustrated as a single unit but it may be divided into two separate units, that is, one unit connected to the master pressure controller 3 and another unit connected to the wheel pressure controller.

The master cylinder 9 is of a tandem type having two pressure chambers, i.e. a primary liquid chamber 42 pressurized by the primary piston 40 and a secondary liquid chamber 43 pressurized by the secondary piston 41. The working liquid pressurized in each pressure chamber by propulsion of the primary piston 40 is supplied to the wheel pressure control mechanism 6 through the master piping 102a to 102b.

The reservoir tank 10 has at least two liquid chambers that are partitioned by a partition and each liquid chamber is connected to each pressure chamber of the master cylinder 9 in such a manner as to be capable of communication.

The wheel cylinder 11a to 11d includes a cylinder, piston, a pad, etc, that are not shown in the drawings. The piston is propelled by the working liquid supplied from the wheel pressure control mechanism 6 and the pad interconnected to the piston is pushed to disc rotor 101a to 101d. Since the disc rotor 101a to 101d turns together with the wheel, the brake torque acting on the disc rotor 101a to 101d operates as the braking force operating between the wheel and the road surface. Incidentally, the term "FL wheel" represents a front left wheel, the term "FR wheel" represents a front right wheel, the term "RL wheel" represents a rear left wheel and the term "RR wheel" represents a rear right wheel.

Next, the construction of the master pressure control mechanism 4 and its operation will be explained.

The driving motor 20 is operated by electric power supplied on the basis of the control instruction of the master pressure controller 3 and generates desired rotational torque. Suitable examples of the driving motor 20 include a DC motor, a DC brushless motor and an AC motor. However, preferred is the DC brushless motor from the aspect of controllability, quietness and durability. The driving motor 20 has a position sensor not shown in the drawing and the sensor signal is inputted to the master pressure controller 3. Consequently, the master pressure controller 3 can calculate the rotation angle of the driving motor 20 on the basis of the signal of the position sensor and can calculate the moving distance of the rotation-translation converter 25, that is, the displacement amount of the primary piston 40.

The speed reduction unit 21 amplifies the rotational torque of the driving motor 20 by the speed reduction ratio of thereof. Gear reduction and pulley reduction are suitable examples of the speed reduction system but the first embodiment employs the pulley reduction system using a driving side pulley 22, a follower side pulley 23 and a belt 24. When the rotational torque of the driving motor 20 is sufficiently great and amplification of the torque by speed reduction is not necessary, the driving motor 20 and the rotation-translation converter 25 can be directly coupled without using the speed reduction unit 21. In this case, various problems resulting from the existence of the speed reduction unit 21 such as reliability, quietness and easiness of mounting can be resolved.

The rotation-translation converter 25 converts the rotational force of the driving motor 20 to the translation force and pushes the primary piston 40. Examples of suitable conversion mechanisms include rack-and-pinion, ball screw, etc, but the first embodiment employs the ball screw system.

The follower side pulley 23 is fitted to the outside of the ball screw nut 26 and the ball screw shaft 27 causes translation motion owing to the rotation of the ball screw nut 26 resulting from the rotation of the pulley 23. The thrust pushes the primary piston 40 through a movable member 28.

One of the ends of a return spring 29 connected at the other end to a fixed portion meshes with the movable member 28 and the force in the opposite direction to the thrust of the ball screw shaft 27 is allowed to act on the ball screw shaft 27 through the movable member 28. Consequently, when the driving motor 20 stops turning and the ball screw shaft 27 becomes uncontrollable during the braking operation, that is, under the state where the primary piston 40 is pushed and the master pressure is applied, too, the ball screw shaft 27 is returned to the initial position by the reaction of the return spring 29 and the master pressure drops near to zero. In this way, the car is prevented from becoming unstable due to dragging of the braking force.

Next, amplification of the thrust of the input rod 7 will be explained.

In the first embodiment, the primary piston 40 is allowed to undergo displacement in accordance with the displacement distance of the input rod 7 by the braking operation of the driver and the thrust of the input rod 7 is amplified, thereby pressurizing the primary liquid chamber 42. The amplification ratio (hereinafter called "boosting ratio") is set to an arbitrary value by a ratio of displacement quantity of the input rod 7 to that of the primary piston 40, the ratio of the sectional area of the input rod 7 to that of the primary piston 40 (hereinafter called "AIR" and "APP", respectively). It is generally known that particularly when the primary piston 40 is allowed to undergo displacement in the same distance as that of the input rod 7, the boosting ratio is primarily determined by (AIR+APP)/AIR. In other words, a predetermined boosting ratio can be acquired always by setting AIR and APP on the basis of the required boosting ratio and controlling the primary piston 40 so that its displacement distance becomes equal to that of the input rod 7. Incidentally, the displacement distance of the primary piston 40 is calculated by the master pressure controller 3 on the basis of the signal of the position sensor not shown in the drawing.

Next, a processing for executing the variable boosting function will be explained.

The variable boosting control processing is a control processing for causing the primary piston 40 to undergo displacement by the quantity as the product obtained by multiplying the displacement distance of the input rod 7 by a proportional gain (hereinafter called "K1"). This K1 value is preferably 1 from the aspect of controllability but when the braking force exceeding the brake operation quantity by the driver is required owing to the emergency brake, etc, the K1 value can be changed temporarily to a value exceeding 1. In consequence, since the master pressure can be elevated much more than the value of the ordinary case (when K1=1) by the same brake operation quantity, a greater braking force can be generated. Here, it is possible to judge the emergency brake by judging whether or not the time change ratio of the signal of the brake operation quantity sensor 8 exceeds a predetermined value, for example.

As described above, because the master pressure is increased or decreased in accordance with the displacement distance of the input rod 7 in response to the brake request from the driver, the variable boosting control processing can generate the braking force as required by the driver. When the K1 value is changed to a value smaller than 1, the variable boosting control processing can be applied to regeneration cooperative brake control wherein the pressure of hydraulic brake is reduced by a certain amount corresponding to a braking force produced by a regenerative brake of a hybrid car.

Next, a processing for executing an automatic brake function will be explained.

The automatic brake control processing is a processing for moving back or forth the primary piston 40 to adjust the operation pressure of the master cylinder 9 to a required liquid pressure of an automatic brake (hereinafter called "automatic brake required liquid pressure").

Various control methods of the primary piston 40 are available in this case. One of the methods extracts the displacement distance of the primary piston 40 accomplishing the automatic brake required liquid pressure on the basis of the relation between the displacement distance and the master pressure which is acquired in advance as a table and sets this displacement distance to the target value. Another method may be used such as a feed-back control of feeding back the master pressure detected by the master pressure sensor 57 and any of these methods may be employed.

Incidentally, it is possible to receive the automatic brake required liquid pressure from an external unit and the control method ca be applied to various brake controls such as a vehicle following control, car off-lane avoiding control, obstacle avoiding control, and so forth.

Next, the construction of the wheel pressure control mechanism 6 and its operation will be explained.

The wheel pressure control mechanism 6 includes gate OUT valves 50a to 50b for controlling the supply of the working fluid pressurized by the master cylinder 9 to each wheel cylinder 11a to 11d, gate IN valves 51a to 51b for controlling the supply of the working liquid pressurized by the master cylinder 9 to the pump, IN valves 52a to 52b for controlling the supply of the working liquid the pump from the master cylinder 9 or the pump to each wheel cylinder 11a to 11d, OUT valves 53a to 53d for pressure-reduction controlling the wheel cylinders 11a to 11d, pumps 54a to 54b for boosting the operation pressure generated by the master cylinder 9, a motor 55 for driving the pumps 54a to 54b and a master pressure sensor 56 for detecting the master pressure. Incidentally, a liquid pressure control unit for controlling an anti-lock brake or a liquid pressure control unit for stabilizing a car behavior is suitable for the wheel pressure control mechanism 6.

The wheel pressure control mechanism 6 includes a first brake system that receives the supply of the working liquid from the primary liquid chamber 42 and controls the braking force of the FL wheel and RR wheel and a second brake system that receives the supply of the working liquid from the secondary liquid chamber 43 and controls the braking force of the FR wheel and the RL wheel. According to such a construction, a normal one of the systems can secure the braking force for the diagonal two wheels even when the other system fails and the behavior of the car can be kept stable.

The gate OUT valves 50a to 50b are opened when the working liquid stored between the master cylinder 9 and the IN valves 52a to 52d and pressurized by the master cylinder 9 is supplied to the wheel cylinders 11a to 11d. The gate IN valves 51a to 51b are opened when the working liquid stored between the master cylinder 9 and the pumps 54a to 54b and pressurized by the master cylinder 9 is boosted by the pumps and supplied to the wheel cylinders 11a to 11d. The IN valves 52a to 52d are provided on the upstream side of the wheel cylinders 11a to 11d and are opened when the working liquid pressurized by the master cylinder 9 or the pumps is supplied to the wheel cylinders 11a to 11d. The OUT valves 53a to 53d are provided on the downstream side of the wheel cylinders 11a to 11d and are opened when the wheel pressure is reduced. Incidentally, all of the gate OUT valves 50a to 50b, the gate IN valves 51a to 51b, the IN valves 52a to 52d and the OUT valves 53a to 53d are of the solenoid type which opens and closes the valves when power is supplied to a built-in solenoid not shown in the drawings. The opening/closing quantity of each valve is adjusted individually by the current control made by the wheel pressure controller 5. These valves may be of the normally-open type or the normally-closed type but in the first embodiment, the gate OUT valves 50a to 50b and the IN valves 52a to 52d are the normally-open valves and the gate IN valves 51a to 51b and the OUT valves 53a to 53d are the normally-closed valves. According to such a construction, even when the supply of electric power is stopped, the gate IN valves 51a to 51b and the OUT valves 53a to 53d are closed while the gate OUT valves 50a to 50b and the IN valves 52a t 52d are opened, and the working liquid pressurized by the master cylinder 9 reaches all the wheel cylinders 11a to 11d. Consequently, the braking force can be generated as required by the driver.

The pumps 54a to 54d elevates the master pressure and supplies the elevated pressure to the wheel cylinders 11a to 11d when a pressure exceeding the operation pressure of the master cylinder 9 is required to execute car behavior stabilization control, automatic brake, and so forth. A plunger pump, a trochoid pump and a gear pump are suitable for the pumps 54a to 54b but the gear pump is preferred from the aspect of quietness.

The motor 55 is driven by electric power supplied on the basis of the control instruction of the wheel pressure controller 5 and drives the pumps 54a to 54b connected to itself. A DC motor, a DC brushless motor and an AC motor are suitable examples of the motor 55 but the DC brushless motor is preferred from the aspect of controllability, quietness and durability.

The master pressure sensor 56 is a pressure sensor that is provided downstream of the master piping 102b on the secondary side and detects the master pressure. The number of master pressure sensors 56 and their installation positions can be arbitrarily set in accordance with controllability, fail safe, and so forth.

Figure 2:
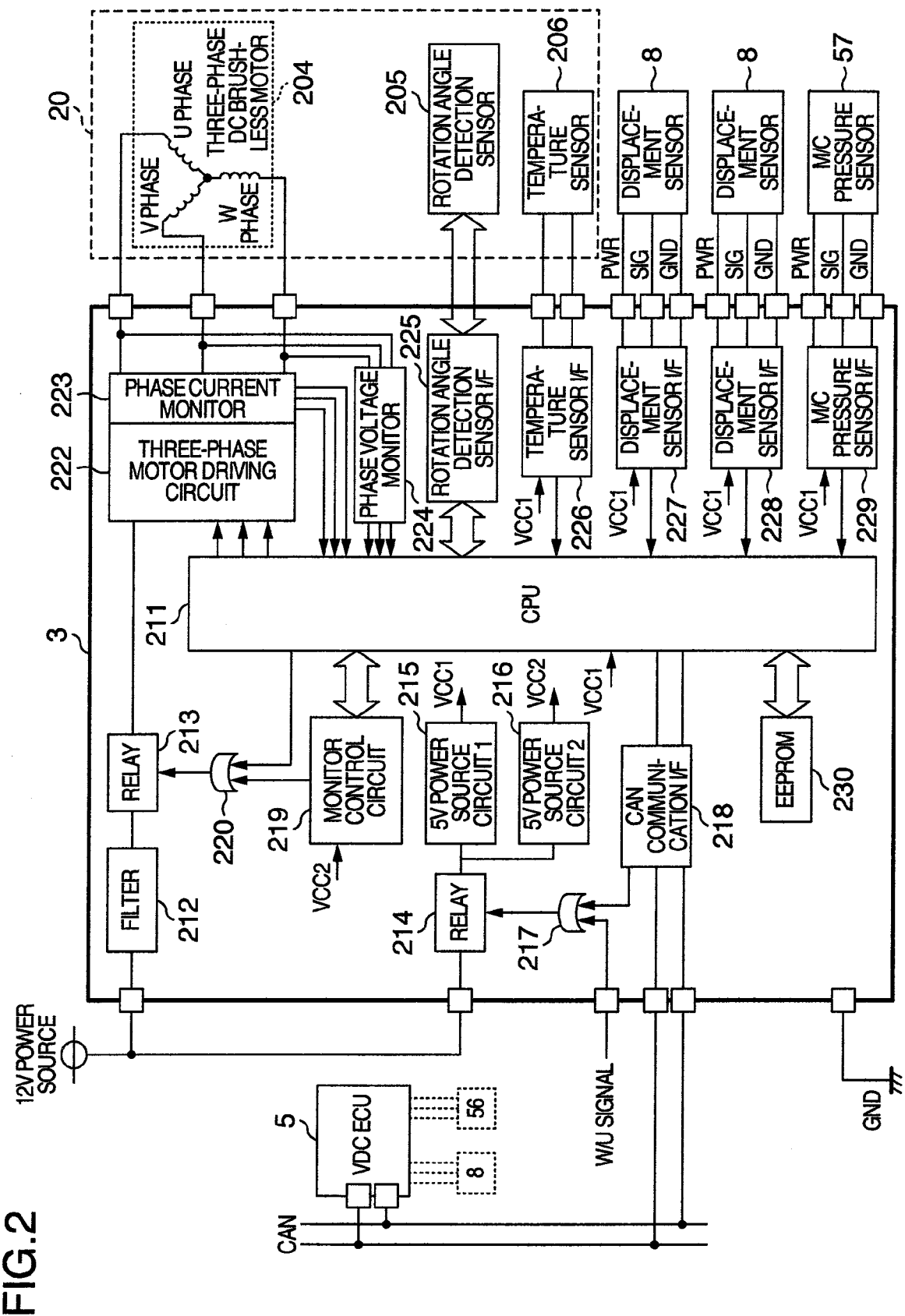
FIG. 2 is a structural view of a master pressure controller 3.

FIG. 2 shows an example of the circuit construction of the master pressure controller shown in FIG. 1.

The electric circuit of the master pressure controller 3 is represented by a thick line frame 201 in the drawing and the electric circuit of the master pressure control mechanism 4, by a dotted line frame 202. A thick line frame 203 represents the wheel pressure controller 5 of VDC, for example.

To begin with, in the electric circuit encompassed by the thick line frame, the power source supplied from the power source line inside the car through an ECU power source relay 214 is inputted to a 5V power source circuit 1 (215) and a 5V power source circuit 2 (216).

The ECU power source relay 214 is turned ON by either one of the start signal and the start signal generated by CAN reception on CAN communication I/F 218a. A door switch signal, a brake switch, an IGN (ignition) switch signal, etc, can be used for the start signal. When a plurality of start signals is used, all the signals are applied to the master pressure controller 3, and when any one of the switches of the plurality of signals is turned ON, the start signal operates to the side that turns ON the ECU power source relay 214.

The stable power source (VCC1) obtained by the 5V power source circuit 1 (215) is supplied to a central control circuit (CPU) 211. The stable power source (VCC2) obtained by the 5V power source circuit 2 (214) is supplied to a monitor control circuit (CPU) 219.

A fail-safe relay circuit 213 can cut off the power source supplied from the power source line inside the car to the three-phase motor driving circuit 222 (described later) and can control supply/cutoff of the power source to and from the three-phase motor driving circuit 222 by the CPU 211 and the monitor control circuit 219.

The power source supplied to the electric circuit through the fail-safe relay circuit 213 is passed through a filter circuit 212 to remove noise and is then supplied to the three-phase motor driving circuit 222.

Car information and control signals such as the automatic brake requested liquid pressure are inputted to the CPU 211 besides the signals from the master pressure controller 3 through the CAN communication I/F circuit 218. The outputs from a rotation angle sensor 205, a motor temperature sensor 206, displacement sensors 207 to 208 and a master cylinder pressure sensor 209 that are arranged on the side of the master pressure control mechanism 4 are also inputted to the CPU 211 through a rotation angle sensor I/F circuit 225, a motor temperature sensor I/F circuit 226, displacement sensor I/F circuits 227 and 228 and a master cylinder pressure sensor I/F circuit 229, respectively. Though this embodiment uses two displacement sensors, the sensor may be plural or single.

The master pressure control mechanism 4 is controlled by inputting in this way the information about the condition of the master pressure control mechanism 4 at this moment and the failure condition is detected.

In other words, the CPU 211 outputs a suitable signal to the three-phase motor driving circuit 222 on the basis of the control signal from the external apparatus and of the detection value of each sensor and controls the motor. In this case, each phase of the three-phase outputs of the three-phase motor driving circuit 222 is equipped with a phase current monitor circuit 223 and a phase voltage monitor circuit 224. These phase current monitor circuit 223 and phase voltage monitor circuit 224 monitor the phase current and the phase voltage, respectively, and their outputs appropriately operate the three-phase motor driving circuit 222 through the CPU 211. The three-phase motor driving circuit 222 is connected to the motor 204 inside the master pressure control mechanism 4 and drives the motor in accordance with the control of the CPU 211. Furthermore, the three-phase motor driving circuit 222 judges the failure of the motor operation when each monitor value comes off from the normal range or when the control is not made in accordance with the control instruction.

The electric circuit in master pressure controller 3 transmits and receives signals to/from the CPU 211. The electric circuit in master pressure controller 3 has a storage circuit 230 formed of EEPROM that stores failure information, for example. The CPU 211 can store the failure information detected and the learning values used for the control in the master pressure control mechanism 4 (such as control gain, offset values of various sensors, etc) in the storage circuit 230. The electric circuit 201 further includes a monitor control circuit 219 for exchanging the signals with the CPU 211 and the monitor circuit 219 monitors the failure of the CPU 211 and the VCC1 voltage. When any abnormality is detected in the CPU 211 and the VCC1 voltage, the fail-safe relay circuit 213 is rapidly operated to cut off the supply of the power source to the three-phase motor driving circuit 222. Monitoring of the monitor control circuit 219 and the VCC2 voltage is executed by the CPU 211.

Next, the failure detection method of the master pressure controller 3 by the wheel pressure controller 5 will be explained.

The first method is the one in which the wheel pressure controller 5 detects the failure information detected inside the master pressure controller 3 through signal line 301.

Here, the CPU 211 may transmit as such the failure information through the CAN communication I/F 218 when detecting the failure. In this case, the wheel pressure controller 5 receives this failure information and judges whether or not backup control is necessary. Alternatively, the CPU 211 may well judge from the failure information whether or not backup is necessary. When backup is judged as necessary, the CPU 211 transmits a backup control request through the CAN communication I/F 218. Receiving this request, the wheel pressure controller 5 shifts the operation mode to the backup control mode by judging the necessity of the backup control (S10 in FIG. 4).

Each of the master pressure controller 3 and the wheel pressure controller 5 periodically makes communication. When the failure of the CPU 211 or the failure of the supply of the power source VCC1 of the CPU 211 occurs, the communication with the master pressure controller 3 becomes impossible. Therefore, when the CAN communication with the master pressure controller 3 becomes infeasible, too, the failure is judged as the failure that needs the backup control by the master pressure controller 3.

When disconnection of the CAN communication of the CAN communication I/F 218 or its failure occurs, the CPU 211 has to detect this infeasibility of the CAN communication and to stop the master pressure control. For, there is the possibility that both master pressure controller 3 and wheel pressure controller 5 execute the control because the master pressure controller 3 can execute the master pressure control.

Figure 3A:
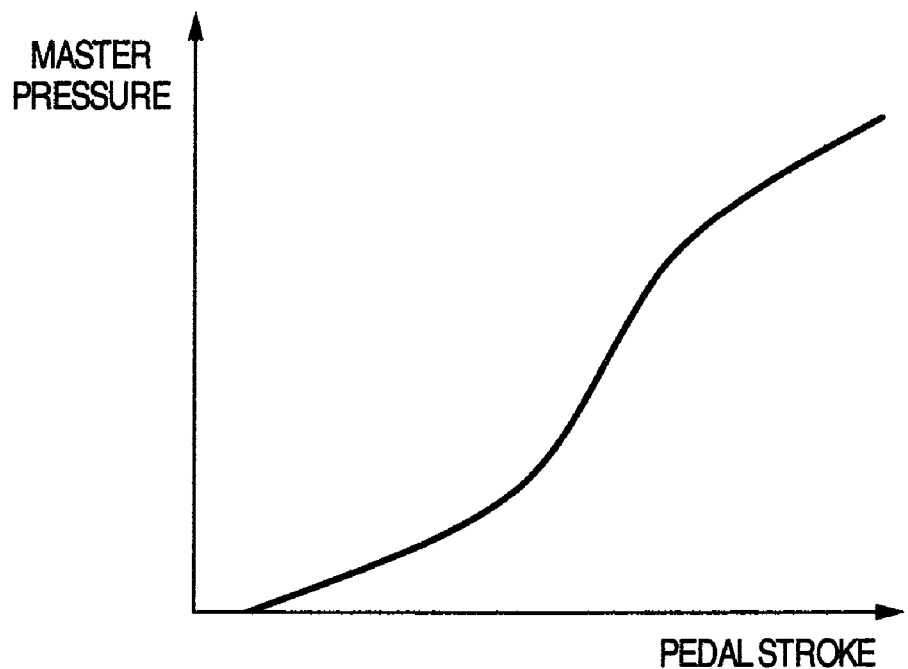
FIGS. 3A and 3B are graphs each showing the relation between a brake operation quantity and a master pressure.
Figure 3B:
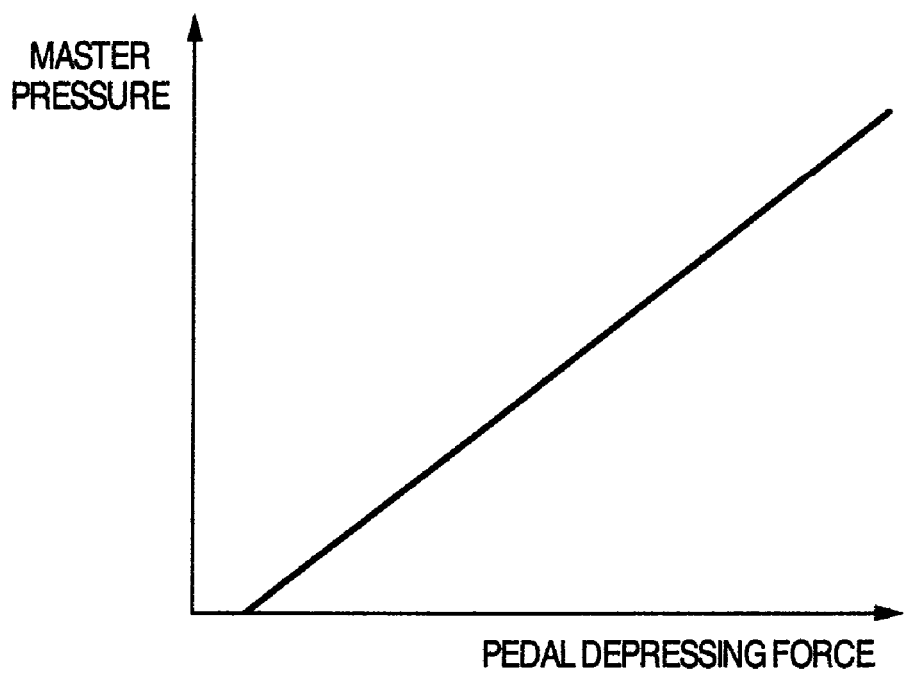

The second method is the one in which the wheel pressure controller 5 detects the failure from the relation of the master pressure with the brake operation quantity. FIGS. 3A and 3B show the relation between the master pressure and the brake operation quantity.

FIG. 3A shows the characteristics when the brake operation quantity is a pedal stroke and FIG. 3B shows the characteristics when the brake operation quantity is the depressing force of the pedal. On the basis of these characteristics, the wheel pressure controller 5 detects the value of the master pressure relative to the brake operation quantity from the brake operation quantity sensor 8 and the master pressure sensor 56. When the relation between the brake operation quantity and the master pressure deviates by a predetermined value from the characteristics shown in FIGS. 3A or 3B and this condition lasts for a predetermined period, the master pressure controller 3 is out of order such that it needs the backup control. When the failure of the CPU 211 or the failure of the supply of the power source VCC1 of the CPU 211 occurs, for example, the failure can be detected because the master pressure does not increase even when the brake operation quantity increases.

When this method is employed, the signal line 301 between the master pressure controller 3 and the wheel pressure controller 5 may be eliminated. In this case, however, two or more sensors in the brake operation quantity detector 8 are preferably wired to the wheel pressure controller. For, the signals of a plurality of sensors must be compared with one another when specific abnormality of the output voltage relative to the physical quantity of the displacement sensor is detected. When the signal line 301 between the master pressure controller 3 and the wheel pressure controller 5 exists, it becomes possible to acquire the brake pedal operation quantity in either one of the master pressure controller 3 and the wheel pressure controller 5 from the other through the communication means and to compare its brake pedal operation quantity.

The above explains the method of detecting the failure of the master pressure controller 3 requiring the backup control by the wheel pressure controller 5 but the first and second methods may be combined, too.

Next, the backup control by the wheel pressure controller 5 will be explained.

Figure 4:
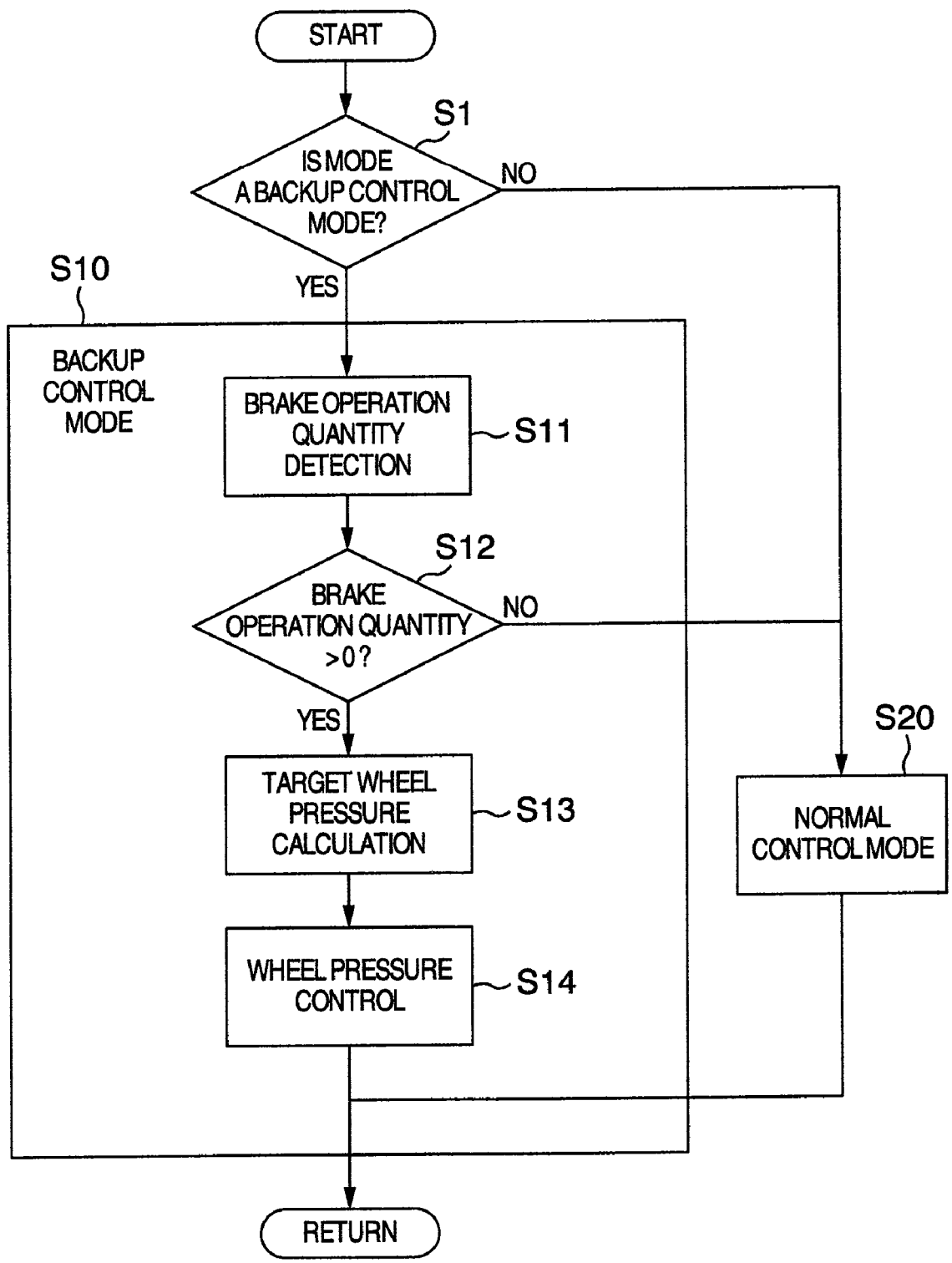
FIG. 4 is a flowchart of a control mode of a wheel pressure controller 5.

FIG. 4 shows an example of the flowchart about the control mode of the wheel pressure controller 5.

To begin with, the wheel pressure controller 5 judges whether or not the control mode enters the backup control mode (S1). The control mode shifts to the backup control mode (S10) when backup of the master pressure controller 3 is judged as necessary and to the normal control mode (S20) when backup is not judged as necessary. Here, when any failure information is received, judgment is made depending on the content of the failure information. When the failure is the stroke sensor failure or the motor failure, for example, the failure is judged as critical such that the control mode has to be changed to the backup control mode. In the case of the thermometer failure, the control mode shifts to the normal control mode because the failure is judged as a minor failure. When the backup control request is received, the content of this request is the result of judgment by the master pressure controller 3 to the effect that backup is necessary. Therefore, the control mode enters as such the backup control mode.

In the backup control mode, the brake operation quantity by the signal input of the brake operation quantity sensor 8 is detected (S11). In the normal control mode, the function of the wheel pressure controller 5 is continued.

Next, the existence/absence of the brake operation by the driver is judged by using the brake operation quantity so detected. When the brake operation quantity is a predetermined value (hereby 0), for example, the driver is not judged as conducting the brake operation and the mode shifts to the normal control mode without conducting the control for increasing the wheel pressure by the backup control mode.

When the brake operation quantity is greater than 0, the driver is judged as conducting the brake operation. The target wheel pressure is calculated on the basis of the brake operation quantity (S13) and the gate IN valves 51$a$ to 51$b$ and the gate OUT valves 50$a$ to 50$b$ are driven and controlled on the basis of the target wheel pressure to execute the wheel pressure control (S14).

Because the wheel pressure controller 5 detects the brake operation quantity as described above, the braking force is not generated when the brake operation does not exist but the braking force corresponding to the brake operation quantity can be generated when the brake operation exists by immediately controlling the wheel pressure. As at least one sensor inside the brake operation quantity sensors 8 is allowed to execute the power supply and signal input processing by the wheel pressure controller 5, the target wheel pressure can be calculated by acquiring the brake operation quantity from the brake operation quantity sensor 8 even when the failure of the CPU 211 or the failure of the supply of the power source VCC1 of the CPU 211 occurs. In this way, a backup braking operation with less effective depressing force and ineffective stroke can be accomplished as in the normal operation.

[Embodiment 2]

Figure 5:
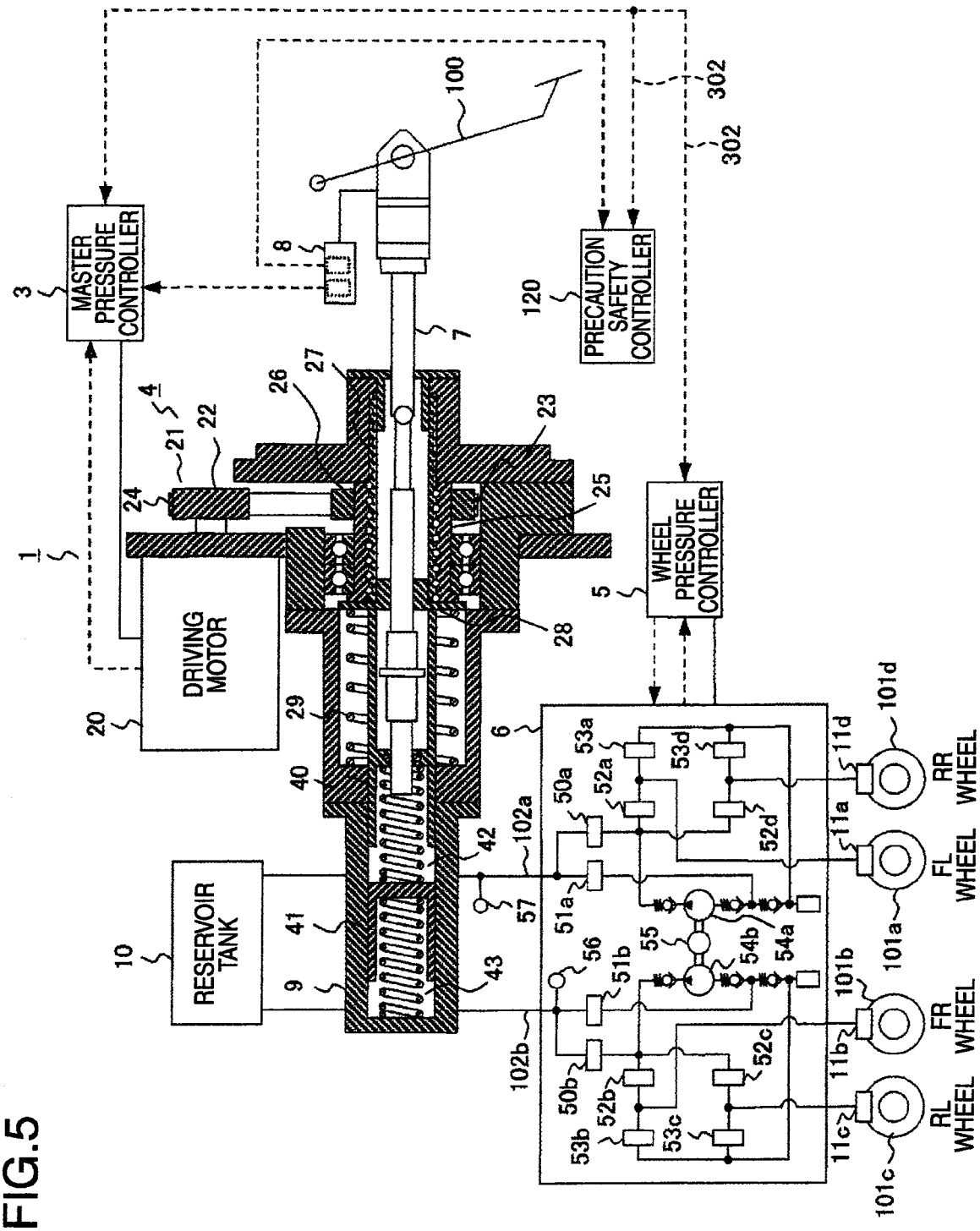
FIG. 5 is an overall structural view of a brake control system according to a second embodiment of the invention.

FIG. 5 shows an overall construction of the brake control system 1 according to the second embodiment and a controller not belonging to the brake control system 1. Incidentally, like reference numerals are used to identify like constituent members as in the first embodiment and the explanation of such members is omitted.

A precaution safety controller 120 does not belong to the brake control system 1. A pre-crush seat belt detects a hard brake operation of the driver from any of a stroke quantity of the brake pedal stepped on, speed, acceleration and depressing force or from a combination of a plurality of the physical quantities, on the basis of the signals of the brake operation quantity sensor 8 and executes control so as to tightly fasten a seal belt.

The master pressure controller 3, the wheel pressure controller 5 and the precaution safety controller 120 execute bidirectional communication and share the brake operation quantity, control instruction, car condition quantity, failure information, operating condition, and so forth.

At least one sensor of the brake cooperation quantity sensor 8 executes the power supply and signal input processing by the precaution safety controller 120 and the rest of the sensors execute the power supply and signal input processing by the master pressure controller 3. Therefore, even when the CPU failure or the power source failure occurs in either one of the master pressure controller 3 and the precaution controller 120, the brake request of the driver can be detected and recognized by the remaining sensors and controllers and failsafe can be secured. Incidentally, when three or more sensors exist in the brake operation quantity sensor 8, it is possible to employ the construction in which the power supply and signal input processing is executed by each of the master pressure controller 3, the precaution safety controller 120 and the wheel pressure controller 5 for each of the sensors.

Next, the method of detecting the failure of the master pressure controller 3 by the wheel pressure controller 5 by using the precaution safety controller 120 will be explained.

The first method is fundamentally the same as the second method of the first embodiment but the data acquired by the signal line 302 from the precaution safety controller 120 is used for the brake operation quantity.

In the second method, the precaution safety controller 120 detects the failure from the relation of the master pressure with the brake operation quantity. In this case, too, the same logic as that of the second method of the first embodiment can be incorporated into the precaution safety controller 120. However, the master pressure used hereby is the data acquired by the signal line 302 from the wheel pressure controller 5. In this case, the precaution safety controller 120 detects the failure of the master pressure controller 3 and transmits the failure of the master pressure controller 3 through the signal line 302 communicating with the wheel pressure controller 5. The wheel pressure controller 5 detects the failure of the master pressure controller 3 through the communication means from the precaution safety controller 120. Incidentally, a combination of at least two of the first method of the first embodiment and the first and second methods of the second embodiment may be used.

As described above, at least one sensor of the brake operation quantity sensor 8 is so constituted as to execute the power supply and signal input processing by the precaution safety controller 120. In consequence, when the failure such as the failure of the CPU 211 or the failure of the supply of the power source VCC1 of the CPU 211 occurs, the target wheel pressure can be calculated by acquiring the brake quantity for use in the backup control mode from the brake operation quantity sensor 8 and backup brake with less ineffective depressing force and less stroke can be accomplished as in the normal operation.

As described above, the invention can provide a brake control system that can start the operation of the backup brake with the equal stroke or depressing force as in the normal operation even when the boosting function fails, can generate the braking force as required by the driver and is excellent in both operation performance and comfort to drive.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A brake control system for a vehicle comprising:
a master pressure controller having a first brake operation quantity sensor that detects a brake operation quantity for controlling a first driving motor that pressurizes working fluid of a master cylinder so as to increase a wheel cylinder pressure of each of a plurality of wheels of said vehicle; and
a wheel pressure controller coupled to said master pressure controller through a communication line, for executing a control function that differs from a control function of said master pressure controller, said control function of said wheel pressure controller controlling a second driving motor to increase said wheel cylinder pressure of each of said wheels of said vehicle, said wheel pressure controller having a second brake operation quantity sensor that detects said brake operation quantity;
wherein said wheel pressure controller further comprises:
a failure judgment unit for judging a failure of said master pressure controller based on i) failure information sent from said master pressure controller via said communication line or ii) a detection result sent from a first failure detection unit of said master pressure controller, indicating a failure of communication between said wheel pressure controller and said master pressure controller via said communication line; and
a wheel cylinder pressure control unit that is operable when said failure judgment unit judges said failure of said master pressure controller, for controlling said wheel cylinder pressure of each of said wheels of said vehicle by increasing said wheel cylinder pressure with said second driving motor, based on said brake operation quantity detected by said second brake operation quantity sensor;
wherein said master pressure controller stops controlling said first driving motor upon a transmission of said failure information, or upon a failure of communication between said master pressure controller and said wheel pressure controller via said communication line, and
wherein either one of said master pressure controller and said wheel pressure controller further includes a master pressure acquisition unit for acquiring a master pressure and a second failure detection unit for detecting said failure of said master pressure controller based on said brake operation quantity detected by said first or second brake operation quantity sensor and said master pressure acquired by said master pressure acquisition unit.

2. The brake control system according to claim 1, wherein said first and second brake operation quantity sensors include a stroke sensor for detecting a movement distance of a brake pedal or a depressing force sensor for detecting force applied to a brake pedal of said vehicle.

3. A brake control system for a vehicle comprising:
a master pressure controller having a first brake operation quantity sensor that detects a brake operation quantity, for controlling a first driving motor which pressurizes working fluid of a master cylinder so as to increase a wheel cylinder pressure of each of a plurality of wheels of said vehicle;
a wheel pressure controller coupled to said master pressure controller through a communication line, for executing a control function that differs from a control function of said master pressure controller, said control function of said wheel pressure controller controlling a second driving motor to increase said wheel cylinder pressure of each of said wheels of said vehicle; and
a further controller coupled to said master pressure controller and said wheel pressure controller through a communication line, for executing a control function that differs from control functions of said master pressure controller and said wheel pressure controller, said further controller having a second brake operation quantity sensor that detects said brake operation quantity; wherein,
said wheel pressure controller further comprises,
a failure judgment unit for judging a failure of said master pressure controller based on i) failure information sent from said master pressure controller via said communication line, or ii) a detection result sent from a first failure detection unit of said master pressure controller, indicating a failure of a communication between said wheel pressure controller and said master pressure controller via said communication line; and
a wheel cylinder pressure control unit that is operable when said failure judgment unit judges said failure of said master pressure controller, for controlling said wheel cylinder pressure of each of said wheels of said vehicle by increasing said wheel cylinder pressure with said second driving motor, based on said brake operation quantity detected by said second brake operation quantity sensor of said further controller,
wherein said master pressure controller stops controlling said first driving motor upon a transmission of said failure information, or upon a failure of communication between said master pressure controller and said wheel pressure controller via said communication line, and
wherein at least one of said master pressure controller, said wheel pressure controller and said further controller includes a master pressure acquisition unit for acquiring a master pressure and a second failure detection unit for detecting said failure of said first controller based on said brake operation quantity detected by said first or second brake operation quantity sensor and said master pressure acquired by said master pressure acquisition unit.

4. The brake control system according to claim 3, wherein said first and second brake operation quantity sensors include a stroke sensor for detecting a movement distance of a brake pedal or a depressing force sensor for detecting force applied to a brake pedal of said vehicle.

5. A brake control system for a vehicle comprising:
a master pressure controller having a first brake operation quantity sensor that detects a brake operation quantity, for controlling a first driving motor which pressurizes working fluid of a master cylinder so as to increase a wheel cylinder pressure of each of a plurality of wheels of said vehicle;

a wheel pressure controller coupled to said master pressure controller through a communication line, for executing a control function that differs from a control function of said master pressure controller, said control function of said wheel pressure controller controlling a second driving motor to increase said wheel cylinder pressure of each of said wheels of said vehicle; and a further controller coupled to said master pressure controller and said wheel pressure controller through said communication line, for executing a control function that differs from said control functions of said master pressure controller and said wheel pressure controller, said further controller having a second brake operation quantity sensor that detects said brake operation quantity;

a master pressure acquisition unit for acquiring a master pressure, disposed in either one of said master pressure controller and said wheel pressure controller, wherein said further controller includes a failure detection unit for detecting a failure of said master pressure controller based on a movement distance of a brake pedal detected by said first or second brake operation quantity sensor and said master pressure acquired by said master pressure acquisition unit, and for transmitting said failure of said master pressure controller as failure information to said wheel pressure controller, said wheel pressure controller further comprises a wheel cylinder pressure control unit that is operable when a failure judgment unit judges said failure of said master pressure controller, for controlling said wheel cylinder pressure of each of wheels of said vehicle by increasing said wheel cylinder pressure with said second driving motor, based on said brake operation quantity detected by said second brake operation quantity sensor of said further controller, said failure judgment unit judging said failure of said master pressure controller based on a detection result of said failure detection unit, and wherein said master pressure controller stops controlling said first driving motor upon a transmission of said failure information, or upon a failure communication between said master pressure controller and said further controller via said communication line.

6. The brake control system according to claim 5, wherein said first and second brake operation quantity sensors include a stroke sensor for detecting said movement distance of said brake pedal or a depressing force sensor for detecting a force applied to said brake pedal of said vehicle.

* * * * *